March 4, 1969  N. D. SMITH, JR., ET AL  3,430,726
ACOUSTICAL METHOD AND APPARATUS FOR MAPPING
THE WALL OF A BOREHOLE
Original Filed Feb. 14, 1966  Sheet 1 of 2

INVENTORS:
N. D. SMITH, JR.
C. B. VOGEL

BY:

THEIR ATTORNEY

INVENTORS:
N. D. SMITH, JR.
C. B. VOGEL
BY: *Theodore E. Bieber*
THEIR ATTORNEY

United States Patent Office 3,430,726
Patented Mar. 4, 1969

3,430,726
ACOUSTICAL METHOD AND APPARATUS FOR MAPPING THE WALL OF A BOREHOLE
Noyes D. Smith, Jr., Bellaire, and Charles B. Vogel, Houston, Tex., assignors to Shell Oil Company, New York, N.Y., a corporation of Delaware
Continuation of application Ser. No. 527,328, Feb. 14, 1966. This application Aug. 28, 1967, Ser. No. 667,033
U.S. Cl. 181—.5
Int. Cl. G10k 10/00, 11/00
5 Claims

ABSTRACT OF THE DISCLOSURE

An acoustical method for mapping the wall of a borehole using a logging tool having ot least one transmitting transducer and one receiving transducer. The transducers are mounted in a unitary array so that the complete assembly can be rotated to sweep 360° of the borehole wall. The signals from the downhole tool are displayed on an oscilloscope wherein the Y axis is controlled in response to the travel time of an impulse between two detectors, the X axis is stepped to correspond to the sweep of the tool, and the Z axis is brightened in response to the acoustic waves that are reflected and scattered back to the transmitting transducer.

---

This application is a continuation of an earlier-filed application Ser. No. 527,328, filed Feb. 14, 1966, now abandoned.

This invention relates to a method and apparatus for mapping the wall of a borehole and more particularly to a method and apparatus that will accurately map the wall of a borehole and present in the form of a continuous log a true record of the surface of the borehole.

Many procedures have been developed in the past to map the wall of a borehole that penetrates various earth formations. Normally these procedures have utilized various photographic means for photographing the wall of a borehole and various television systems for scanning the wall of a borehole and transmitting the picture image to the surface. Also various systems have been developed that use deformable materials for obtaining an impression of the wall of a borehole. In addition to the above methods that attempt to obtain a pictorial presentation of the physical characteristics of the borehole, systems using various physical stresses, as, for example, acoustical energy, resistivity and conductivity, have been used to log a borehole to obtain responses that indicate the characteristics of various formations penetrated by the borehole.

Of the above methods, those that obtain a pictorial presentation of the borehole wall have several limitations. For example, those that attempt to photograph the borehole wall or scan the borehole wall with a television camera are limited to boreholes containing a relatively clear liquid. This limitation means that such systems are limited almost exclusively to boreholes that are drilled as water wells or are capable of being filled with water. Thus, such systems are of little use in surveying boreholes that are normally drilled as petroleum producing wells. Petroleum wells are normally drilled using a drilling mud that is weighted with various materials to prevent an inflow of fluid from fluid containing formations. While in some isolated cases it is possible to replace the drilling mud with water and still control the well, such cases are extremely limited.

Systems that depend upon the use of a deformable material to take a physical impression of the formation surface are limited due to the inability to survey any great length of the borehole.

Systems that use various logging techniques such as acoustical or resistivity techniques for mapping a borehole wall have in the past provided only sketchy and inaccurate presentations of the formations. For example, one system utilizes a transducer that rotates about the central axis of the borehole and emits an acoustical impulse and receives back the reflected impulse. At the surface the received signals are displayed on an oscilloscope face, more particularly, on an oscilloscope face of the type used in plan position indicators. Thus, the presentation has the appearance of a cross-section of the borehole. This type of presentation is very difficult to interpret and provides very little information concerning the characteristics of the surface of the borehole wall. Similarly, systems that utilize a relatively small number of sensing elements and then plot the response of each element separately provide only a limited amount of information concerning the characteristics of the borehole wall.

The present invention is directed to a unique recording system in which the information is displayed in a form that provides a map of the borehole wall. More particularly, the map provided by the present invention presents a picture of the surface of the wall unrolled onto a flat surface.

The system of this invention utilizes a downhole tool having at least one transducer for transmitting acoustical energy and two transducers for receiving acoustical energy. The transmitter is preferably a transmitting and receiving transducer disposed to direct acoustical impulses at an angle towards the borehole wall and receive back scattered and reflected refracted surface waves. While receiving scattered and reflected refracted surface waves the transmitter is disposed to discriminate against reflected and scattered body waves. In the preferred embodiment the two detectors are disposed to receive the acoustical waves that are refracted along the surface of the borehole wall. The transmitter and the two detectors are mounted as a unitary structure in the downhole tool so that the complete assembly can be rotated to sweep 360 degrees of the borehole wall. The firing of the transmitter is controlled by a circuit that generates a fixed number of cycles for each rotation of the downhole tool. The signals from the transmitter and receivers are transmitted to a surface recording system.

The surface recording system preferably utilizes a cathode ray oscilloscope in which the X axis is controlled by the pulsing of the downhole transmitter. For each pulsing of the transmitter the X axis is stepped a fixed amount. In addition, the distance over which the X axis is stepped is divided into the same number of units as the fixed number of cycles in a complete rotation of the downhole instrument. Thus, for each rotation of the downhole instrument the X axis makes on complete sweep. The Y axis of the oscilloscope sweep is controlled in response to the travel time of the acoustic impulse between the two detectors in the downhole tool. Further, the Y axis sweep is initiated for each displacement of X axis. The brightening or Z axis of the oscilloscope is controlled by the receiving response of the transmitter transducer to the reflected and scattered surface waves. Thus there is displayed on the face of the oscilloscope a series of vertical lines with a single line of the display corresponding to signals resulting from a single pulse of the transmitter during a revolution of the downhole tool. Further, the speed of the vertical sweep, and thus the distance along the vertical sweep, is related to the velocity of the pulse through the formation.

The face of the oscilloscope is photographed with the film advance being controlled by the movement of the downhole tool through the borehole. This provides a film record accurately displaying the characteristics of the surface of the borehole wall. The film record presents the display in the form of a continuous visual record displaying 360 degrees of the borehole wall.

The inclination and azimuth of the downhole tool is also measured and the related signals transmitted to the surface. This information can be separately recorded in order that the map of the borehole wall can be coordinated with the geographic north and the inclination of the borehole. Also, it is desirable that the depth of the tool in the borehole be displayed on the oscilloscope or within the field of the camera in order that the depth may be photographed at the same time that the display on the face of the oscilloscope is photographed.

The above objects and advantages of this invention will be more easily understood from the following description of a preferred embodiment when taken in conjunction with the attached drawings in which.

Figure 1:
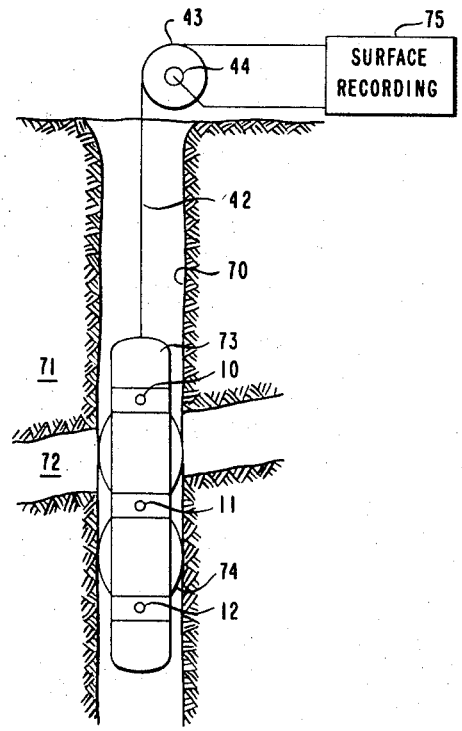
FIGURE 1 is an elevation view of a cross section of a borehole showing the applicants' invention disposed therein.

Referring now to FIGURE 1, there is shown a downhole logging tool 73 disposed within the borehole 70 that penetrates various earth formations 71 having an inclined bedding plane 72 disposed therein. The bedding plane 72 is assumed to have different physical characteristics from the bulk of the formation 71, for example, the formation 71 could be a shale formation while the bedding plane 72 could be a sand bed traversing the shale formation. The downhole logging tool is provided with a transmitting-receiving transducer 10 and two receiving transducers 11 and 12 that will be described in greater detail below. The logging tool is also provided with centering springs 74 to maintain the tool centered within the borehole 70. The logging tool is connected to the surface recording equipment 75 by means of a logging cable 42. The logging cable 42 is a multiple conductor cable that provides sufficient conductors for transmitting power to the logging tool and signals from the logging tool to the surface. In addition, the cable 42 is provided with sufficient mechanical strength to permit lowering and raising of the tool within the borehole. At the surface the cable 42 passes over the measuring sheave 43 that drives a selsyn unit 44. Thus, the measuring sheave will accurately determine the depth of the tool in the borehole while the selsyn unit 44 will supply an electrical signal related to the depth.

When the system shown in FIGURE 1 is operated, the tool 73 is lowered into the borehole. Upon reaching the bottom the tool is then withdrawn at a constant rate while the transmitter is pulsed as explained below. The signals are transmitted to the surface where they are recorded by the surface recording system. The speed of the film advance for the record is controlled in relation to the depth of the tool in the borehole and thus the record is accurately related to the depth of the tool.

Figure 4:
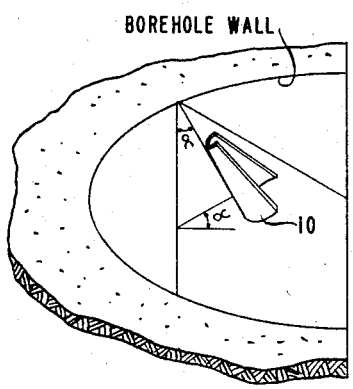
FIGURE 4 is a schematic showing of one form of transducer that may be used with the instrument of FIGURE 1.
Figure 3:
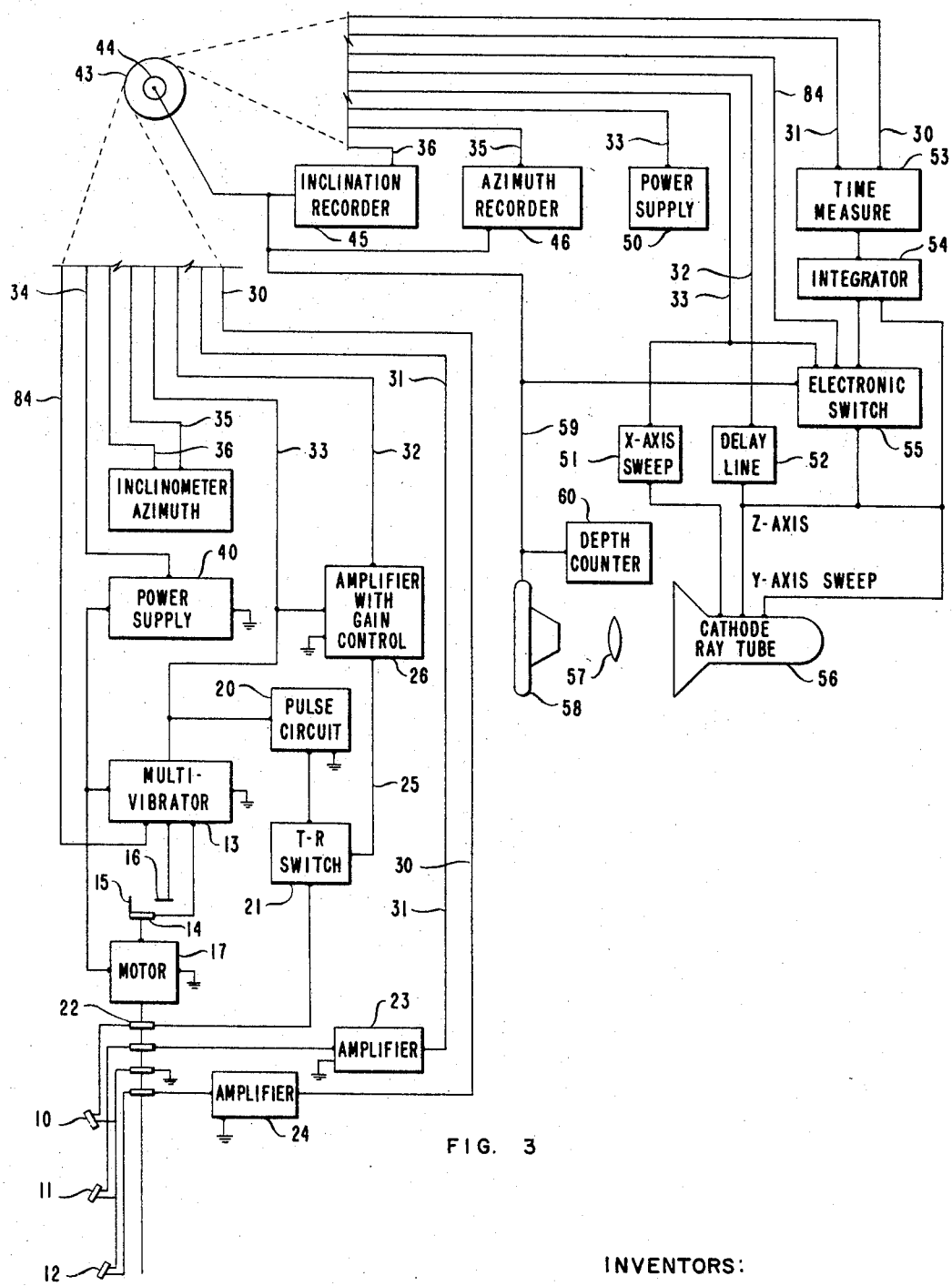
FIGURE 3 is a block diagram drawing of a mapping system constructed in accordance with this invention.

The construction of the downhole tool and the surface recording system is shown in greater detail in FIGURE 3. In FIGURE 3 the transmitting-receiving transducer 10 and the two receiving transducers 11 and 12 are shown inclined at an angle to the surface of the borehole. If the transmitting transducer 10 is a point source, waves will be radiated both up and down the borehole wall and body as well as surface waves will be generated and received from both above and below the transducer. By using half of a section of a cone of barium titanate as a transducer, as shown in FIGURE 4, with an element of the cone making a suitable angle $\alpha$ with an element of the cylindrical borehole, the generation and reception of surface waves can be enhanced with respect to the body waves. The optimum value of $\alpha$ is determined by the relations in $\alpha = V_1/V_2$ where $V_1$ is the velocity of acoustic waves in the fluid filling the borehole and $V_2$ is the velocity of the surface waves on the borehole wall. By backing the halfcone transduver with an acoustic absorbing material, very little energy will be radiated up the borehole. The two plane receiving transducers 11 and 12 are correspondingly disposed with their surfaces at an angle to the surface of the borehole to improve their response to surface waves traveling along the surface of the borehole wall. The transmitting transducer 10 is preferably excited at an ultrasonic frequency so as to generate waves propagating substantially normal to its surface. For example, if the transducer is excited at a frequency of 30–50 kilocycles per second and the cone has a slant height of approximately ½ inch, then the waves emitted from the transducer will be substantially normal to its surface. The use of such a transducer will minimize its response to undesired waves impinging thereon at various angles.

In operation the transmitting transducer 10 is energized to generate an acoustical impulse which is transmitted outwardly towards the borehole wall. At the surface of the borehole, the acoustical impulse will be refracted and travel along the surface of the borehole wall until it encounters a discontinuity or change in the surface of the borehole wall. When it encounters a discontinuity or change a portion of the acoustical impulse will be scattered and/or reflected back towards the transmitting transducer 10. After the transmitting transducer 10 has generated the acoustical impulse it is switched to a receiving condition to receive the reflected and scattered radiation. A portion of the acoustical impulse will also travel on and be received at the receiving transducers 11 and 12. The signals from the transducers 11 and 12 will be transmitted to the surface in order that the travel time of the acoustical impulse over a known interval in the earth material can be measured. The measured travel time is used to control the recording system as explained below.

The three transducers are mounted on a suitable supporting structure including a central shaft. The supporting structure is rotated by a motor 17 in order that the transducers may sweep or map the complete surface of the borehole. The individual transducers are coupled to a series of slip rings 22 in order that the signals may be transmitted to the remaining downhole equipment.

The upper end of the motor shaft is equipped with a rotating slip ring 14 containing a switch contact 15 that closes with the contact 16 to generate a pulse once for each revolution of the motor contact 15. This pulse is used to initiate the operation of the remainder of the downhole equipment including multivibrator 13. The multivibrator 13 is a free running multivibrator that is started upon the closing of the switch 15 and 16 to divide the rotation of the downhole unit into a fixed number of pulses.

The multivibrator 13 is coupled to a pulse circuit 20 with the circuit 20 producing a suitable pulse for firing the transmitter 10 to generate an acoustical impulse. The pulse circuit 20 is coupled to the transmitter receiver switch 21 which in turn is coupled to a slip ring assembly 22. The transmitter receiver switch 21 receives the pulse from the pulse circuit 20 and transmits it to the transducer 10. The transmitter receiver switch then couples the transmitting transducer 10 to the receiving circuit that consists of an amplifier 26 having an automatic gain control.

From the above description it is seen that the motor 17 rotates the downhole assembly and the multivibrator 13 divides each revolution into a fixed number of segments. For each segment the pulse circuit 20 generates a pulse to energize the transmitter 10 to produce an acoustical impulse. After the production of the impulse the transmitting transducer 10 is switched to a receiving circuit by the transmit receiver switch 21. Thus, the transducer 10 generates an impulse and then receives back the reflected and/or scattered refracted surface waves.

The receiving transducers 11 and 12 are coupled to amplifiers 23 and 24, respectively. The amplifiers 23 and 24 are coupled by means of conductors 30 and 31 to the surface recording system, the conductors 30 and 31 being part of the logging cable 42 that contains the remaining conductors 32–36. As explained above, the logging cable provides conductors for connecting the various portions of the downhole tool to the surface recording system as well as the mechanical strength for raising and lowering the tool within the borehole. The amplifier 26 having an automatic gain control is coupled to the surface through the conductor 32 while the multivibrator 13 is connected to the surface through the conductor 31. The power from the surface is supplied over a conductor 34 to a power supply 40. The power supply 40 is designed to supply the necessary power to the various downhole electronic circuits as well as the motor 17. None of the connections between the power supply 14 and the downhole electronics are shown in FIGURE 3 to avoid undue confusion of the drawing.

An inclinometer and azimuth measuring device 41 is disposed in the downhole tool and coupled to the surface through conductors 35 and 36. The inclinometer and azimuth measuring device is preferably of the type that measures the inclination and the azimuth of the inclination of the borehole tool and supplies related electrical signals. Various types of devices for fulfilling these requirements are known and shown in the prior art. Thus, no description is included in the present application.

At the surface the cable 42 passes over the measuring sheave 43 that determines the position of the tool in the borehole. The measuring sheave 43 drives a selsyn unit 44 that converts the measured depth to a related electrical signal with the electrical signal being supplied to the various elements of the surface recording system by means of a conductor 59.

At the surface the two conductors 30 and 31 are coupled to a time measuring circuit 43. The time measuring circuit 53 measures the elapsed time between the arrival of the acoustic impulse at the receiver 11 and the receiver 12. The elapsed time is supplied as an electrical quantity to the Y sweep control circuit 54. This circuit contains means for controlling the velocity of the Y sweep so that it covers the sweep across the face of the tube 56 in twice the time required for a surface wave to travel between transducers 11 and 12.

The lead 32 from the downhole amplifier 26 is coupled to a delay line 52. The delay line 52 has a delay that exceeds the longest time anticipated for the travel time of the acoustic impulse between receiving transducers 11 and 12. The output signal from the delay line 52 is used to actuate the Z axis or the brightening of the electron beam of tube 56. In addition, the signal from the delay line is used to operate the sweep circuit 55 to cause the Y axis to commence a sweep of the oscilloscope. The conductor 33 is coupled to the X axis sweep circuit 51 to control the X axis sweep of the tube 56. The sweep circuit 51 is designed so that it steps the X axis sweep in a series of uniform increments. More particularly, the X axis sweep is stepped a fixed distance for each pulsing of the downhole transmitting-receiving transducer 10.

The signal displayed on the front of the tube 56 is focused by means of a lens 57 onto a camera 58. The camera photographs the face of the tube 56 once for each revolution of the downhole logging tool. The film advance of the camera 58 is controlled by means of the selsyn unit 44. Thus, the film record is directly related to the depth of the tool in the borehole. Likewise, the signal from the selsyn unit 44 may be used to actuate a depth countre 60 that is positioned so that it will be photographed by the camera 58.

If the vertical speed of the tool is such that it has advanced the distance between the transducers 11 and 12 in the exact time required for one revolution of the motor 17, the mapping of the borehole wall will be continuous and there will be no overlap of traces on the film. In order to prevent overlap for varying speeds the position of the tool in the hole indicated by the selsyn 44 is brought to electronic switch circuit 55. A signal from the multivibrator 13 is fed to a ring counter or other means in 55 for keeping track of the start of each revolution of the motor 17. If change in depth is less than the distance between transducers 11 and 12, a ratio of this distance to the distance between 11 and 12 is used to blank the Z axis by grounding at this proportion of the Y sweep time.

If the vertical speed of the tool is small compared to a revolution of motor 17 a voltage from 55 controlled by the selsyn can be transmitted to the input of the multivibrator 13 by conductor 84 to prevent the multivibrator from firing until the distance traveled is equal to the distance between transducers 11 and 12.

When velocity changes in the face of the borehole wall are small, it will sometimes be desirable to inactivate the electronic switch 55 and log at a slow vertical speed so that there will be a high degree of overlap between the succeeding scans of the transducers. In this manner the signals received will be mixed and an improvement in signal to noise will be obtained.

In order to emphasize surface waves over body waves, the time interval during which reflected and diffracted waves are recorded can be chosen to take place after a definite time for example after the first arrival at transducer 12 and during an interval equal to the travel time between 11 and 12. This can be accomplished by providing a delay circuit in the Y sweep circuit 14 so that the triggering of the Y sweep is delayed by a chosen amount after the arrival of the Z axis signal at the output of delay line 52.

The signals from the inclination and azimuth measuring circuit 41 are recorded by means of recorders 45 and 46. These recorders are also driven by the selsyn unit so that the record will be directly related to depth. Thus, it will be possible to coordinate the film record from the camera 58 with the inclination and azimuth of the borehole and the position at which the film record was made.

From the above description it is seen that the X axis sweep of the cathode ray tube 56 is controlled in response to the position of the downhole tool. More particularly, the X axis is stepped in a plurality of fixed increments with one increment for each pulsing of the downhole transmitter 10. The Z axis, or brightness of the tube 56 is controlled in response to the reflected and/or scattered surface waves received by the transmitting-receiving transducer 10. The Y axis sweep of the oscilloscope is controlled in response to the velocity of the acoustic impulses through the formations that resulted in the scattering and refraction of radiation. Thus, the record produced on the face of the oscilloscope tube 56 is recorded in relation to the velocity as well as the position of the downhole tool, and thus in relation to the respective depths of production of reflected or scattered surface waves.

Figure 2:
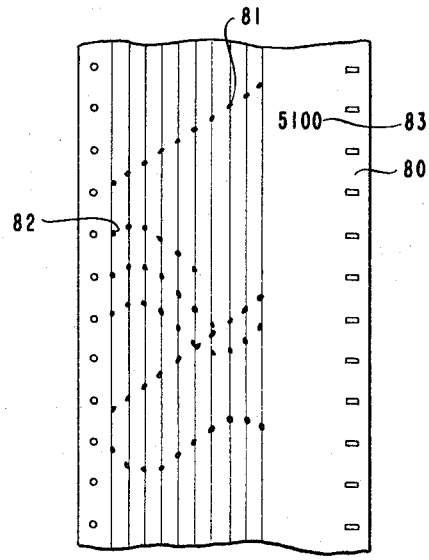
FIGURE 2 is a portion of a film record made utilizing the recording system of this invention.

A portion of the actual record is shown in FIGURE 2 and consists of a plurality of vertical lines 82. There is one vertical line for each position along the X axis of the oscilloscope tube 56. As explained above, one position of recording is provided for each firing of the transmitting receiving transducer 10 during a single revolution of the downhole tool. The record will also be provided with a diagonal line across the face of the film record 81 that corresponds to the positions of the transmitting transducer at the times it was fired. Since the tool is continuously rising in the borehole, the positions of the transmitting-receiving transducer 10 will be successively shallower. The heavy dots 82 on the film record are the result of scattered or reflected surface waves received by the transmitting-receiving transducer 10. As explained above, the Z axis or beam brightening circuit is controlled by the received signal and thus it will cause the trace to be brightened in certain spots and the pattern produced on the film will correspond to the interface between two different formations or other discontinuities occurring on the surface of the borehole. Printed on the right side of the film record 80 will be a depth indication, as, for example, 5100 shown at 83.

From the above description it is seen that the film record will have the appearance of a map of the surface of the borehole. The discontinuities and other anomalies in the surface of the borehole will appear as anomalously brightened or darkened spaces on the film record. For example, a thin sand bed that passes through the predominant formation of the borehole and intersects the borehole at an angle will cause two parallel sinusoidal lines to be drawn on the film record. The separation of these sinusoidal lines will be approximately equal to the thickness of the bedding plane. Similarly, cave sections or other anomalies will appear as various irregular, closed figures on the film record.

We claim as our invention:

1. A process for mapping the wall of a borehole comprising:
   generating an acoustic impulse at a position near the wall of the borehole, said acoustical impulse being generated in a manner to enhance the production of surface waves along the borehole wall and minimize the production of body waves in the formation surrounding the borehole;
   selectively receiving a portion of said waves that have traveled along the surface of the wall and have been reflected back along the surface toward their point of generation;
   measuring the rate at which the acoustic waves travel along said wall surface;
   advancing an indicating means relative to a recording medium at a rate proportional to said measured acoustic wave travel rate; and
   actuating said indicating means to start said advancing in time correspondence with said acoustic impulse generation and to provide an indication in time correspondence with said reception of said selectively received portion of the acoustic waves, whereby the distance along the recording medium between the start of the advancing and the position of the indication is proportional to distance along the borehole wall.

2. The process of claim 1 wherein the Y axis sweep of an oscilloscope is advanced at a rate proportional to the measured acoustic wave travel rate and the Z axis is controlled by said reception of a portion of the acoustic waves.

3. The process of claim 1 wherein a plurality of impulses are generated at a plurality of positions around the borehole whereby the complete wall of the borehole is mapped.

4. The process of claim 3 wherein a separate recording is made for each impulse.

5. The process of claim 3 wherein the Y axis sweep of an oscilloscope is advanced at a rate proportional to the measured acoustic wave travel rate, the Z axis is controlled by said reception of a portion of the acoustic waves and the X axis of the oscilloscope is stepped a discrete amount for each impulse generated during one complete sweep of the borehole.

References Cited

UNITED STATES PATENTS

| | | | |
|---|---|---|---|
| 2,648,056 | 8/1953 | Jakosky | 340—18 |
| 2,825,044 | 2/1958 | Peterson | 340—18 |
| 3,021,706 | 2/1962 | Cook et al. | 73—67.8 |
| 3,302,165 | 1/1967 | Anderson et al. | 181—.5 |
| 3,136,381 | 6/1964 | Anderson | 181—0.5 |

BENJAMIN A. BORCHELT, *Primary Examiner.*

JAMES FOX, *Assistant Examiner.*

U.S. Cl. X.R.

340—10, 15.5